(12) United States Patent
Lee

(10) Patent No.: US 12,143,051 B2
(45) Date of Patent: Nov. 12, 2024

(54) DRIVING APPARATUS OF SEMICONDUCTOR MANUFACTURING EQUIPMENT AND DRIVING METHOD OF SEMICONDUCTOR MANUFACTURING EQUIPMENT

(71) Applicant: SEMES CO., LTD., Chungcheongnam-do (KR)

(72) Inventor: Junbeom Lee, Gyeonggi-do (KR)

(73) Assignee: SEMES CO., LTD., Cheonan-si (KR)

( * ) Notice: Subject to any disclaimer, the term of this patent is extended or adjusted under 35 U.S.C. 154(b) by 708 days.

(21) Appl. No.: 17/137,258

(22) Filed: Dec. 29, 2020

(65) Prior Publication Data
US 2021/0211074 A1 Jul. 8, 2021

(30) Foreign Application Priority Data
Jan. 2, 2020 (KR) .................. 10-2020-0000479

(51) Int. Cl.
*H02P 5/46* (2006.01)
*H02P 5/68* (2006.01)

(52) U.S. Cl.
CPC . *H02P 5/46* (2013.01); *H02P 5/68* (2013.01)

(58) Field of Classification Search
CPC ...................................... H02P 5/46; H02P 5/68
See application file for complete search history.

(56) References Cited

U.S. PATENT DOCUMENTS

| 5,153,490 | A | * | 10/1992 | Ueta | ............... | G05B 19/19 700/193 |
|---|---|---|---|---|---|---|
| 5,712,540 | A | * | 1/1998 | Toda | ............... | F24F 11/88 318/46 |
| 5,777,443 | A | * | 7/1998 | Chang | ............... | H02P 5/52 270/52.17 |
| 6,188,194 | B1 | * | 2/2001 | Watanabe | ............... | G05B 19/406 318/563 |

(Continued)

FOREIGN PATENT DOCUMENTS

| JP | 5250964 B2 | 4/2013 |
|---|---|---|
| KR | 10-0184892 B1 | 4/1999 |

(Continued)

OTHER PUBLICATIONS

Office Action issued in corresponding China Patent Application No. 202011630265.1, issued Apr. 25, 2024, 9 pages.

*Primary Examiner* — Rina I Duda

(74) *Attorney, Agent, or Firm* — Procopio, Cory, Hargreaves & Savitch LLP

(57) ABSTRACT

A driving apparatus of semiconductor manufacturing equipment is disclosed. The driving apparatus includes a first driver for applying a signal driving a first motor and a second driver for applying a signal driving a second motor. The first driver and the second driver drive the first motor and the second motor in different schemes. The driving apparatus further includes a controller that performs integrated control of the first driver and the second driver. Each of the first driver and the second driver is connected with the controller through an I/O cable. The controller identifies the (Continued)

first driver or the second driver using information input through the I/O cable. The controller changes a signaling scheme depending on a driving mode of the motor corresponding to the identified driver.

7 Claims, 4 Drawing Sheets

(56) References Cited

U.S. PATENT DOCUMENTS

| | | | | |
|---|---|---|---|---|
| 6,791,294 | B1* | 9/2004 | Kazama | G05B 19/414 |
| | | | | 318/567 |
| 7,119,505 | B2* | 10/2006 | Komaki | G05B 19/408 |
| | | | | 370/452 |
| 8,379,358 | B2* | 2/2013 | Takahashi | H02P 31/00 |
| | | | | 361/93.6 |
| 8,421,393 | B2* | 4/2013 | Pellen | H02P 6/04 |
| | | | | 318/599 |
| 8,648,553 | B2* | 2/2014 | Slettevoll | H02P 1/54 |
| | | | | 318/8 |
| 9,548,683 | B2* | 1/2017 | Fukuda | B60H 1/00428 |
| 2007/0120513 | A1* | 5/2007 | Tanaka | G05B 19/414 |
| | | | | 318/568.11 |
| 2008/0197797 | A1* | 8/2008 | El-Ibiary | H02K 11/35 |
| | | | | 318/567 |
| 2010/0308756 | A1* | 12/2010 | Kwang | B41J 29/38 |
| | | | | 318/51 |
| 2014/0333234 | A1* | 11/2014 | Takahashi | H02P 8/40 |
| | | | | 318/558 |

FOREIGN PATENT DOCUMENTS

| | | |
|---|---|---|
| KR | 10-2004-0064105 A | 7/2004 |
| KR | 10-2007-0058301 A | 6/2007 |
| KR | 100734345 B1 | 7/2007 |
| KR | 10-2008-0047785 A | 5/2008 |
| KR | 10-2012-0059216 A | 6/2012 |
| KR | 101642757 B1 | 7/2016 |
| KR | 10-1742094 B1 | 5/2017 |
| KR | 102025010 B1 | 9/2019 |

* cited by examiner

DRIVING APPARATUS OF SEMICONDUCTOR MANUFACTURING EQUIPMENT AND DRIVING METHOD OF SEMICONDUCTOR MANUFACTURING EQUIPMENT

CROSS-REFERENCE TO RELATED APPLICATIONS

A claim for priority under 35 U.S.C. § 119 is made to Korean Patent Application No. 10-2020-0000479 filed on Jan. 2, 2020, in the Korean Intellectual Property Office, the entire contents of which are hereby incorporated by reference.

BACKGROUND

Embodiments of the inventive concept described herein relate to a driving apparatus of semiconductor manufacturing equipment and a driving method of the semiconductor manufacturing equipment, and more particularly, relate to a method for controlling driving apparatuses driven in different schemes in the semiconductor manufacturing equipment using one controller.

A driving apparatus of a cylinder, a motion control board, a motor, or the like is required as an apparatus for moving instruments, which rotate or move to a plurality of locations, to a specific location in semiconductor manufacturing equipment. According to an example, the motor is a power generator which is essentially used in various industrial devices or machine tools, and it is important for the motor to perform driving control.

An existing technology performs driving using motors and drivers, which are manufactured by one enterprise, in one product equipment. The motors and the drivers manufactured by the one enterprise are driven using the same firmware. The driver may generate current for driving the motor. A controller may apply a control signal for driving of a speed of the driver.

However, rather than using the motors and the drivers manufactured by the one enterprise in the one product equipment, when using motors and drivers manufactured by two or more enterprises, the following problems may occur.

It is possible for the motors and the drivers manufactured by the same enterprise to perform processing using one firmware corresponding to the motors and the drivers. However, motors and drivers manufactured by different enterprises should perform processing using different firmware corresponding to the motors and the drivers. Thus, when motors and drivers manufactured by a plurality of enterprises are used in one produce equipment, because a plurality of firmware respectively corresponding to the motors and the drivers should be provided to perform processing, loads occur. Because the loads should be separately adjusted, there is a complex problem due to processing.

Furthermore, when a driver or firmware is changed after product equipment is set up, there is an inconvenience of having to apply separate firmware depending on types of a motor and a driver. When firmware which does not correspond is incorrectly applied, because a driving distance is not accurate, there is a probability that this will lead to an additional accident.

SUMMARY

Embodiments of the inventive concept provide a driving apparatus for integrating and controlling drivers, each of which has a different driving mode.

Problems to be solved by the inventive concept are not limited to the above-described problems. Other problems which are not described herein may be clearly understood by those skilled in the art from the specification and the accompanying drawings.

A driving apparatus of semiconductor manufacturing equipment may be disclosed.

According to an exemplary embodiment, a driving apparatus of semiconductor manufacturing equipment may include a first driver that applies a signal driving a first motor and a second driver that applies a signal driving a second motor. The first driver and the second driver may drive the first motor and the second motor in different schemes, respectively. The driving apparatus may further include a controller that performs integrated control of the first driver and the second driver.

According to an embodiment, each of the first driver and the second driver may be connected with the controller through an input/output (I/O) cable.

According to an embodiment, the I/O cable may include a plurality of pins.

According to an embodiment, the controller may identify the first driver or the second driver using information input through the I/O cable.

According to an embodiment, the controller may change a signaling scheme depending on a driving mode of a motor corresponding to the identified driver.

According to an embodiment, the controller may obtain an initial location value of the motor using a scheme of obtaining an initial value of the motor corresponding to the identified driver.

According to an embodiment, the controller may calculate a pulse applied to the motor using a method for calculating an encode pulse of the motor corresponding to the identified driver.

According to an embodiment, the first motor according to the first driver may use a scheme which decodes serial data of the first motor to obtain the initial location value.

According to an embodiment, the second motor according to the second driver may use a scheme which decodes the number of pulses of the second motor to obtain the initial location value.

According to an embodiment, the controller may calculate an encode pulse value with regard to the number of revolutions of the motor corresponding to the identified driver.

According to an exemplary embodiment, a driving method of semiconductor manufacturing equipment including a plurality of drivers driven in different schemes and a controller that controls the plurality of drivers may be disclosed.

According to an exemplary embodiment, a driving method of semiconductor manufacturing equipment may include receiving information of a driver driving a motor to be driven among the plurality of drivers and selecting and controlling a driving mode of the driver corresponding to the received information.

According to an embodiment, the receiving of the information of the driver driving the motor to be driven among the plurality of drivers may include identifying a unique ID each of the plurality of drivers has through an I/O cable connected with the controller.

According to an embodiment, the selecting and controlling of the driving mode of the driver corresponding to the received information may include obtaining an initial location value of a motor using a scheme of obtaining an initial value of the motor corresponding to the identified driver.

According to an embodiment, the selecting and controlling of the driving mode of the driver corresponding to the received information may include calculating a pulse applied to a motor using a method for calculating an encode pulse of the motor corresponding to the identified driver.

According to an embodiment, the scheme of obtaining the initial value of the motor may be a scheme which decodes serial data of the motor to obtain the initial location value.

According to an embodiment, the scheme of obtaining the initial value of the motor may be a scheme which decodes the number of pulses of the motor to obtain the initial location value.

According to an embodiment, the method for calculating the pulse may include calculating an encode pulse value with regard to the number of revolutions of the motor corresponding to the identified driver.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
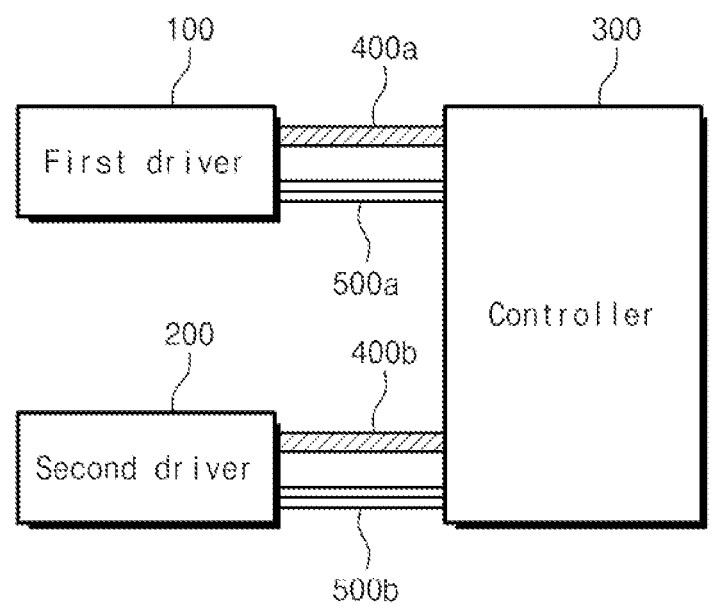
FIG. 1 is a block diagram illustrating a driving apparatus of semiconductor manufacturing equipment according to an embodiment of the inventive concept.

Advantages, features, and methods of accomplishing the same according to the inventive concept will become apparent with reference to embodiments described in detail below together with the accompanying drawings. However, the inventive concept is not limited by embodiments disclosed hereinafter, and may be implemented in various different forms. Rather, these embodiments are provided so that the disclosure of the inventive concept will be thorough and complete and will fully convey the concept of the invention to those skilled in the art, and the inventive concept will only be defined by the appended claims.

Unless otherwise defined herein, all terms (including technical and scientific terms) used herein may have the same meaning that is generally understood by a person skilled in the art to which the inventive concept belongs. Terms, including those defined in commonly used dictionaries, should be interpreted as having a meaning that is consistent with their meaning in the context of the relevant art and will not be interpreted in an idealized or overly formal sense unless expressly so defined herein.

Terms used in the specification are used to describe embodiments and are not intended to limit the inventive concept. In the specification, the terms of a singular form may include plural forms unless otherwise specified. The meaning of 'comprises' and/or various conjugations of this verb, for example, 'comprising' specifies a composition, a component, a constituent, a step, an operation and/or an element but does not exclude other compositions, components, constituents, steps, operations and/or elements. The term 'and/or' in the specification indicates each of stated elements and one or more combinations of the stated elements.

The terms such as 'first' and 'second' are used to describe various elements, but it is obvious that such elements are not restricted to the above terms. The above terms are used only to distinguish one element from the other. For example, a first element may be referred to as a second element within the technical scope of the inventive concept, and similarly, the second element may be referred to as the first element.

The terms of a singular form may include plural forms unless otherwise specified in context. Furthermore, in the drawings, the shapes, sizes, and the like of elements may be exaggerated for clearer description.

The term '~unit' used in the specification may be a unit of processing at least one function or operation, which may refer to, for example, software or hardware, such as a field programmable gate array (FPGA) or an application-specific integrated circuit (ASIC). However, the '~unit' is not limited to software or hardware. The '~unit' may be configured to be included in an addressable storage medium or to reproduce one or more processors.

For example, the '~unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided from a component and '~unit' may be divided and performed by a plurality of components and '~units' and may be integrated with another additional component.

FIG. 1 is a block diagram illustrating a driving apparatus of semiconductor manufacturing equipment according to an embodiment of the inventive concept.

According to FIG. 1, the driving apparatus of the semiconductor manufacturing equipment according to an embodiment of the inventive concept may include a first driver 100, a second driver 200, and a controller 300.

The first driver 100 may be physically connected with the controller 300 through two cables which play different roles.

The second driver 200 may be physically connected with the controller 300 through two cables which play different roles.

According to an example, the first driver 100 may be connected with the controller 300 through a cable 400a for connection. The second driver 200 may be connected with the controller 300 through a cable 400b for connection.

The cables 400a and 400b for connection may be cables for driving drivers at the controller 300, which may process on/off of a servo driver or may drive an encoder, an inposition, or the like.

The cables 400a and 400b for connection may play a role in connecting the drivers 100 and 200 with the controller 300 in conjunction with actually driving the drivers 100 and 200.

According to an example, the first driver 100 may be connected with the controller 300 through an I/O cable 500a. The second driver 200 may be connected with the controller 300 through an I/O cable 500b.

Each of the I/O cables 500a and 500b may refer to an input/output cable. Each of the I/O cables 500a and 500b may play a role in delivering unique information of each of the drivers 100 and 200 to the controller 300. The I/O cables 500a and 500b may be provided for the purpose of dividing characteristics of the drivers 100 and 200.

Each of the I/O cables 500a and 500b may be provided in the form of a plurality of pins. According to an example, each of the I/O cables 500a and 500b may be provided in the form of three pins.

According to an example, each of the I/O cables 500a and 500b may be provided in the form of three pins, which may be provided for the purpose of dividing 23 (=8) drivers.

According to an example, each of the I/O cables 500a and 500b may be provided in the form of three pins, and voltage may be supplied to each pin. Each of the I/O cables 500a and 500b may match a unique ID of the driver connected thereto with a voltage supply method at a pin included in each of the I/O cables 500a and 500b to verify whether the corresponding driver has any unique ID when information is applied to the controller 300 through each of the I/O cables 500a and 500b.

According to an example, the I/O cable 500a connected to the first driver 100 may transmit (0, 0, 0) V to the controller 300. According to an example, the I/O cable 500b connected to the second driver 200 may transmit (0, 0, 5) V to the controller 300. Such matching information may be previously input to the controller 300.

When (0, 0, 0) V is transmitted to the controller 300, the controller 300 may identify the first driver 100. When (0, 0, 5) V is transmitted to the controller 300, the controller 300 may identify the second driver 200. When the identifying of the driver is completed, the controller 300 may perform control by applying firmware corresponding to each driver.

As a result, the controller 300 may verify information about parts of a driver and a motor to be controlled and may match whether each of the parts obtains an initial value in any scheme with a method for calculating a specification and encode pulse of the motor.

When the identifying of the driver is completed, the controller 300 may transmit a control signal suitable for a movement location of a process module to the driver. The process module may refer to a control target. The control signal may be identical to data stored in the driver in response to the movement location of the process module. When the control signal is applied to the driver, the driver may output a pulse signal as high as the value stored in the driver to the motor in response to setting data embedded in the driver. The motor may drive the process module in response to the pulse signal. A method for calculating the pulse signal may differ for each driver.

According to an example, the driver may include a memory for storing setting data, an encoder for detecting an operation state of the motor, and a switch panel for selecting a data communication or input/output interface for intercommunication with a controller. The memory may store setting data corresponding to a movement location where the motor is driven.

According to an example, the memory may store pulse signal data for locations to be moved, and the controller may change the setting data. Furthermore, parameter conditions such as speed and acceleration upon movement are programmable.

The encoder may detect an operation state of the motor, which is processed in response to a pulse signal output from the driver to the motor, and may output the detected signal to the controller. According to an example, the encoder may be provided in the driver. According to another example, the encoder may be disposed independently of the driver.

For various driving of the driving apparatus, the switch panel may be provided to facilitate intercommunication using a data communication and input/output interface between the controller and the driver.

The driving apparatus according to an embodiment of the inventive concept may include the encoder for verifying a location according to an operation state of the motor and the driver for driving the motor. The driving apparatus may intercommunicate with the controller via the input/output interface to control a process module to move to a desired location.

Figure 2:
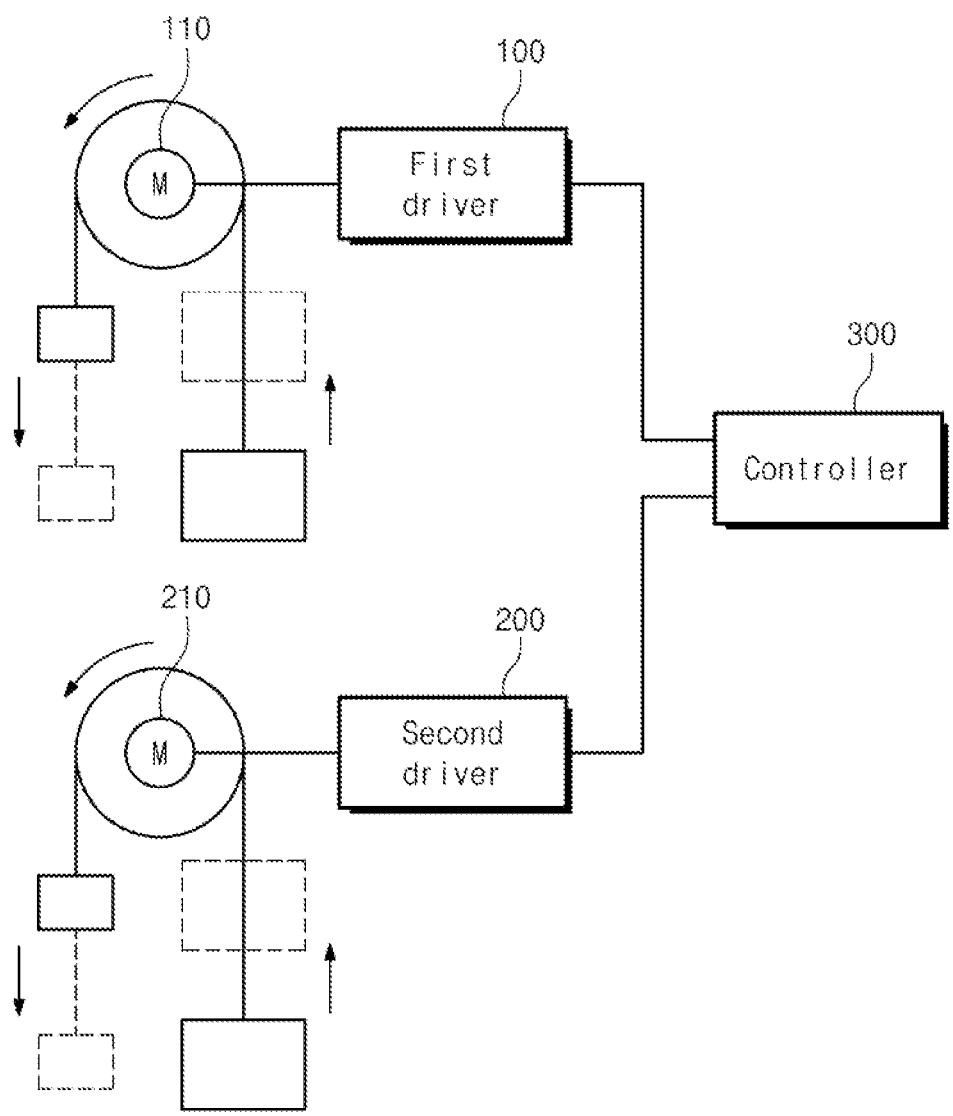
FIG. 2 is a drawing illustrating a driving method of a driving apparatus of semiconductor manufacturing equipment according to an embodiment of the inventive concept.

FIG. 2 is a drawing illustrating a driving method of a driving apparatus of semiconductor manufacturing equipment according to an embodiment of the inventive concept.

According to FIG. 2, a configuration where a first driver 100 is connected with a first motor 110 may be disclosed. According to FIG. 2, a configuration where a second driver 200 is connected with a second motor 210 may be disclosed. The first driver 100 and the second driver 200 may apply driving signals to the first motor 110 and the second motor 210 respectively connected thereto.

The first motor 110 and the second motor 210 may drive driving apparatuses respectively connected thereto. According to an example of FIG. 2, the first motor 110 and the second motor 210 may drive pulleys, respectively.

Each of the first driver 100 and the first motor 110 and the second driver 200 and the second motor 210 may obtain an initial value using a method described below. A method for obtaining an absolute encoder initial value may vary with vendors of a motor and a driver, that is, parts.

The first driver 100 and the first motor 110 may obtain and deliver an initial location value through serial data.

The second driver 200 and the second motor 210 may obtain and deliver an initial location value through the number of pulses.

Thus, as a scheme which obtains data of an initial location value varies with a driver, a control scheme may vary for each driver type.

Furthermore, there may occur a difference in a detailed specification of the motor depending on the vendors of the motor and the driver. In detail, there may be a difference in an encoder pulse which is generated per revolution for each type of the motor.

According to an example, the first motor 110 corresponding to the first driver 100 may generate 8192 pulses per revolution. When generating 8192 pulses per revolution, the first motor 110 may move 10 cm.

According to an example, the second motor 210 corresponding to the second driver 200 may generate 4096 pulses per revolution. When generating 4096 pulses per revolution, the second motor 210 may move 10 cm.

In other words, because a difference in a pulse value for moving the same distance occurs when a driver and a motor which are produced by different enterprises are used, information of the driver and the motor may be received to perform calculation depending on the received information.

In other words, firmware applied for each type of the motor and firmware applied for each type of the driver should differ from each other.

A controller 300 according to an embodiment of the inventive concept may include both of firmware for driving the first driver 100 and firmware for driving the second driver 200, such that it is possible to control a plurality of drivers driven in different schemes in an integrated manner.

Furthermore, the controller 300 may assign a unique ID for each driver and may identify a driver type using a method of matching the unique ID through each of I/O cables 500a and 500b and inputting the unique ID to the controller 300. Each of the I/O cables 500a and 500b may deliver the unique ID to the controller 300 using a voltage supply scheme matched to the unique ID.

Like the above-mentioned example, when the I/O cable 500a connected with the first driver 100 transmits (0, 0, 0) V to the controller 300, the controller 300 may recognize the first driver 100. To fetch an initial value, the controller 300 may decode serial data, which is a manner obtaining the initial value in the first driver 100. When having to moving 10 cm, the controller 300 may deliver a command of an 8192-pulse value corresponding to the number of revolutions of the first motor 110 to the first driver 100.

Like the above-mentioned example, when the I/O cable 500b connected with the second driver 200 transmits (0, 0, 5) V to the controller 300, the controller 300 may recognize the second driver 200. To fetch an initial value, the controller 300 may decode the number of pulses, which is a manner obtaining the initial value in the second driver 200. When having to moving 10 cm, the controller 300 may deliver a command of a 4096-pulse value corresponding to the number of revolutions of the second motor 210 to the second driver 200.

In other words, in an embodiment of the inventive concept, there may be a difference in a method for obtaining an initial value depending on a type of each of the driver and the motor and there may be a difference in a method for calculating an encode pulse. An embodiment of the inventive concept discloses that there are only the two differences in the method for obtaining the initial value and the method for calculating the encode pulse, but is not limited thereto. It is obvious that it is applicable that there is a difference in a control scheme in a driver and a motor, which are manufactured by different vendors.

In an embodiment of the inventive concept, the driver may deliver a unique ID of the motor and the driver, that is, identifiable information to the controller 300 through an I/O cable. The controller 300 may change a control logic depending to the delivered unique ID or may convert a rotation or movement distance scale to perform control processing.

Figure 3:
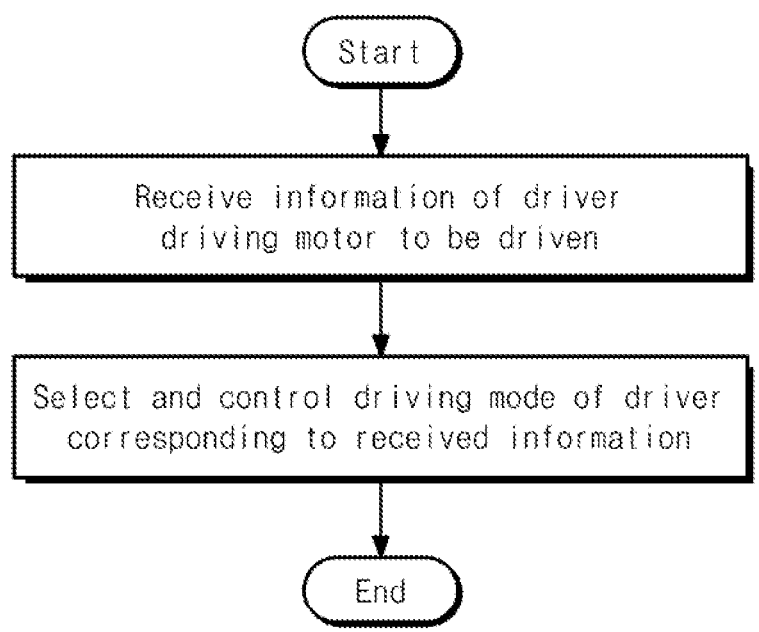
FIG. 3 is a flowchart schematically illustrating a driving method of semiconductor manufacturing equipment according to an embodiment of the inventive concept.

FIG. 3 is a flowchart schematically illustrating a driving method of semiconductor manufacturing equipment according to an embodiment of the inventive concept.

Referring to FIG. 3, in an embodiment of the inventive concept, a controller 300 of FIG. 2 may receive information of a driver which drives a motor to be driven. The information of the driver may be a unique ID the driver has. In the method for receiving the information of the driver, the controller 300 may receive the information of the driver through an I/O cable connected with the controller 300.

According to an example, because the I/O cable is composed of a plurality of pins, the controller 300 may identify the information of the driver through the plurality of pins.

The controller 300 may select and control a driving mode of the driver corresponding to the received information. When the driver corresponding to the received information is a first driver 100 of FIG. 2, the controller 300 may select and control a driving mode for driving the first driver 100 and a first motor 110. When the driver corresponding to the received information is a second driver 200 of FIG. 2, the controller 300 may select and control a driving mode for driving the second driver 200 and a second motor 210.

Figure 4:
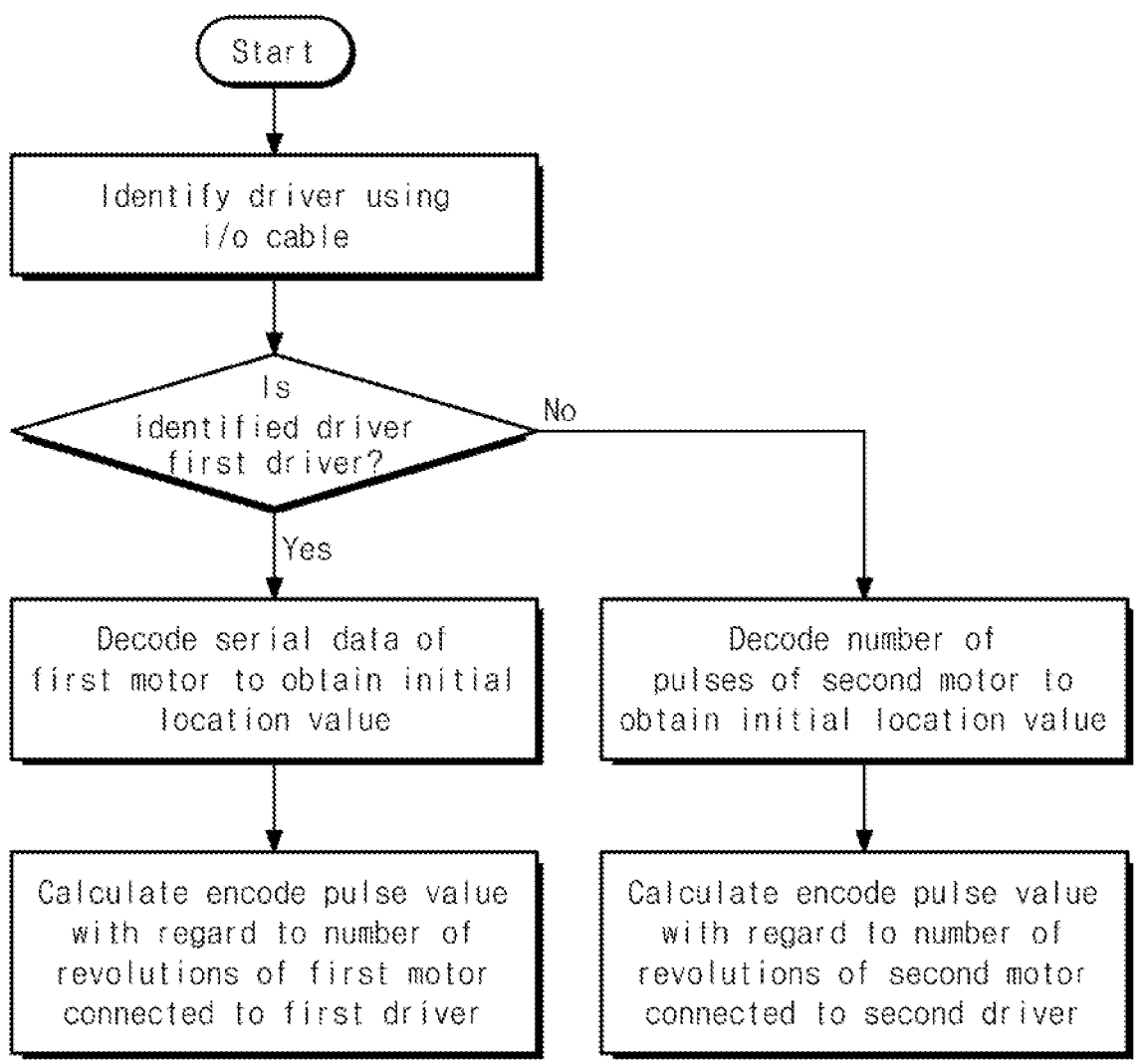
FIG. 4 is a flowchart illustrating in detail a driving method of semiconductor manufacturing equipment according to an embodiment of the inventive concept.

FIG. 4 is a flowchart illustrating in detail a driving method of semiconductor manufacturing equipment according to an embodiment of the inventive concept.

Referring to FIG. 4, in an embodiment of the inventive concept, a controller 300 of FIG. 2 may receive information of a driver which drives a motor to be driven. The information of the driver may be identified using an I/O cable. The I/O cable may include a plurality of pins. The plurality of pins and a unique ID of each driver may be matched, and the matched information may be delivered to the controller 300.

When the identified driver corresponds to a first driver 100 of FIG. 2, the controller 300 may select and control a driving mode for driving the first driver 100 and a first motor 110.

According to an example, to drive the first driver 100 and the first motor 110, there may be a need for a process of obtaining an initial location value of the first motor 110 and calculating a pulse value to be input to the first motor 110.

To obtain the initial location value of the first motor 110, the controller 300 may decode serial data of the first motor 110 to obtain the initial location value. According to an example, the serial data of the first motor 110 may be provided as an ASCII code. The controller 300 may decode the ASCII code to analyze the initial location value. Furthermore, the controller 300 may calculate a pulse value to be input, with regard to the number of revolutions of the first motor 110 connected to the first driver 100.

When the identified driver corresponds to a second driver 200 of FIG. 2, the controller 300 may select and control a driving mode for driving the second driver 200 and a second motor 210.

According to an example, to drive the second driver 200 and the second motor 210, there may be a need for a process of obtaining an initial location value of the second motor 210 and calculating a pulse value to be input to the second motor 210.

To obtain the initial location value of the second motor 210, the controller 300 may decode the number of pulses of the second motor 210 to obtain the initial location value. Furthermore, the controller 300 may calculate a pulse value to be input, with regard to the number of revolutions of the second motor 210 connected to the second driver 200.

The driving apparatus of the semiconductor manufacturing equipment which is shown and described according to an embodiment of the inventive concept discloses only the first driver 100 and the second driver 200, but the number of drivers is not limited thereto. The driving apparatus of the semiconductor manufacturing equipment may further include a third driver which drives a motor in a different scheme from the first driver 100 and the second driver 200. In other words, the driver may be plural in number.

In an embodiment of the inventive concept, the controller may identify a characteristic of a driver using I/O information transmitted from the driver and may differently perform a control method to suit the identified characteristic of the driver to perform integrated control.

In detail, the controller may differently apply a logic for obtaining an initial value of an encoder to suit the identified characteristic of the driver. In more detail, the controller may differently calculate settings of a pulse value upon one revolution of a motor to suit the identified characteristic of the driver. Thus, although software is not provided separately in the driver for applying and processing different schemes, it is possible to manage motors and drivers of various parts companies using one integrated software.

When the motor stops inadvertently due to failure, blackout, or the like when the motor is driven, a control signal should be delivered to the motor to resume the driving of the motor. As such, when having to quickly deliver the control signal, an embodiment of the inventive concept may quickly identify a driver through the connected I/O cable to perform control using a control scheme corresponding to the identified driver.

In an embodiment of the inventive concept, the driving apparatus capable of integrating and controlling drivers, each of which has a different driving mode, may be disclosed.

According to an embodiment of the inventive concept, because it is possible to perform integrated control of drivers, each of which has a different driving mode, it is more efficient and economic that an existing technology.

According to an embodiment of the inventive concept, although operations of a motor and a driver stop by an external impact or the like, the driving apparatus may read information of the stopped motor and driver to quickly respond.

Effects of the inventive concept are not limited to the above-described effects. Other effects which are not described herein may be clearly understood by those skilled in the art from the specification and the accompanying drawings.

The foregoing embodiments are provided to help understanding of the inventive concept, but do not limit the scope of the inventive concept. It should be understood that various modifiable embodiments are belong to scopes of the inventive concept. The drawings provided in the inventive concept only illustrate an exemplary embodiment of the inventive concept. The range of protection of the inventive concept is defined by technical idea of claims, the range of protection of the inventive concept is not limited to literal description itself, however, it should be understood that technical value of the inventive concept extends to inventions of equivalent scope.

What is claimed is:

1. A driving apparatus of semiconductor manufacturing equipment, the driving apparatus comprising:
    a first driver configured to apply a signal driving a first motor;
    a second driver configured to apply a signal driving a second motor,
        wherein the first driver and the second driver drive the first motor and the second motor in different schemes, respectively;
    a controller configured to perform integrated control of the first driver and the second driver,
    wherein the first driver is connected with the controller through a first input/output (I/O) cable that includes a plurality of pins,
    wherein the second driver is connected with the controller through a second input/output (I/O) cable that includes a plurality of pins,
    wherein the controller identifies the first driver or the second driver using first information inputted through the first I/O cable and second information inputted through the second I/O cable to the controller directly from each of the first driver and the second driver, the first information and the second information including a voltage applied to each of the pins of the first I/O cable and the second I/O cable,
    wherein the first information and the second information are different, and
    wherein each of the first I/O cable and second I/O cable matches a unique ID of the first driver and second driver, respectively, with the applied voltage to said each of the pins to verify whether a corresponding driver has the unique ID when the first information and the second information are transmitted to the controller through the first I/O cable and second I/O cable, respectively.

2. The driving apparatus of claim 1, wherein the controller changes a signaling scheme depending on a driving mode of a motor corresponding to the identified driver.

3. The driving apparatus of claim 2, wherein the controller obtains an initial location value of the motor using a scheme of obtaining an initial value of the motor corresponding to the identified driver.

4. The driving apparatus of claim 2, wherein the controller calculates a pulse applied to the motor by calculating an encode pulse of the motor corresponding to the identified driver.

5. The driving apparatus of claim 3, wherein the first motor according to the first driver uses a scheme which decodes serial data of the first motor to obtain the initial location value.

6. The driving apparatus of claim 3, wherein the second motor according to the second driver uses a scheme which decodes a number of pulses of the second motor to obtain the initial location value.

7. The driving apparatus of claim 4, wherein the controller calculates an encode pulse value with regard to a number of revolutions of the motor corresponding to the identified driver.

* * * * *